United States Patent [19]

Wolf

[11] 4,235,257
[45] Nov. 25, 1980

[54] ELASTIC SEATING ELEMENT FOR A CUTOFF DEVICE

[76] Inventor: Franz-Josef Wolf, Sprudelallee 19, 6483 Bad Soden-Salmunster, Fed. Rep. of Germany

[21] Appl. No.: 909,455

[22] Filed: May 25, 1978

[30] Foreign Application Priority Data

Mar. 20, 1978 [DE] Fed. Rep. of Germany ....... 2812224

[51] Int. Cl.³ .............................................. F16K 25/00
[52] U.S. Cl. .................................. 137/242; 251/170; 251/328
[58] Field of Search ....................... 137/237, 238, 242; 251/172, 170, 317, 326–329

[56] References Cited

U.S. PATENT DOCUMENTS

| 2,973,181 | 2/1961 | Johnson | 251/172 |
| 3,073,336 | 1/1963 | Johnson | 137/375 |
| 3,356,334 | 12/1967 | Scaramucci | 251/328 X |
| 3,575,377 | 4/1971 | Carlton et al. | 137/242 X |

Primary Examiner—Martin P. Schwadron
Assistant Examiner—Richard Gerard
Attorney, Agent, or Firm—Burns, Doane, Swecker & Mathis

[57] ABSTRACT

A seating element is positioned in a flow cutoff device. The seating element includes a central opening for conducting fluid flow. The flow cutoff device includes an apertured sealing member which slides across a seating portion of the seating element between open and closed positions. The seating portion includes a rim surrounding the central opening and a transverse surface surrounding the rim. The rim projects axially beyond the junction of the rim and surface. The seating element is mounted under compression so that the transverse surface flexes against the sealing member and functions to scrape away particulate matter when the sealing member is opened and closed, and to prevent twisting of the rim.

5 Claims, 4 Drawing Figures

U.S. Patent     Nov. 25, 1980     4,235,257
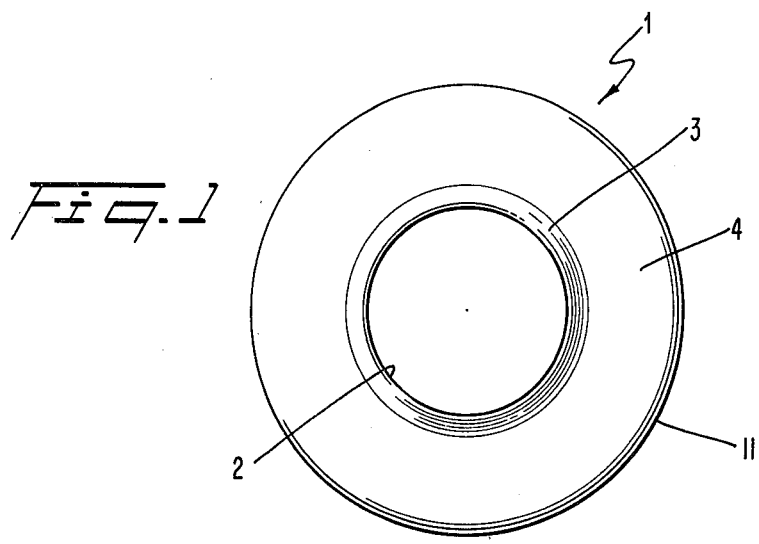
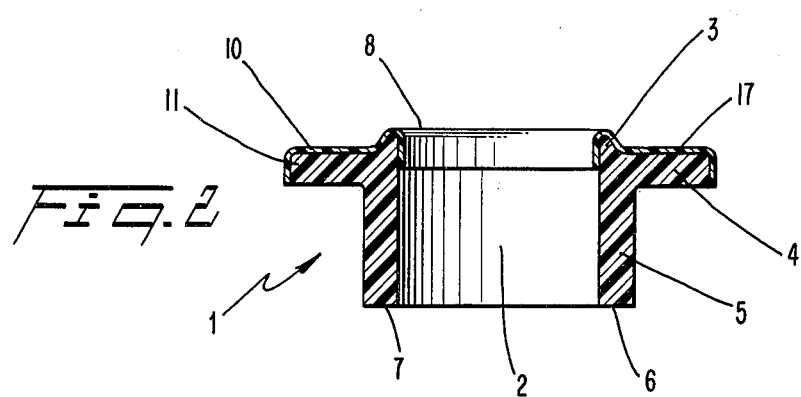
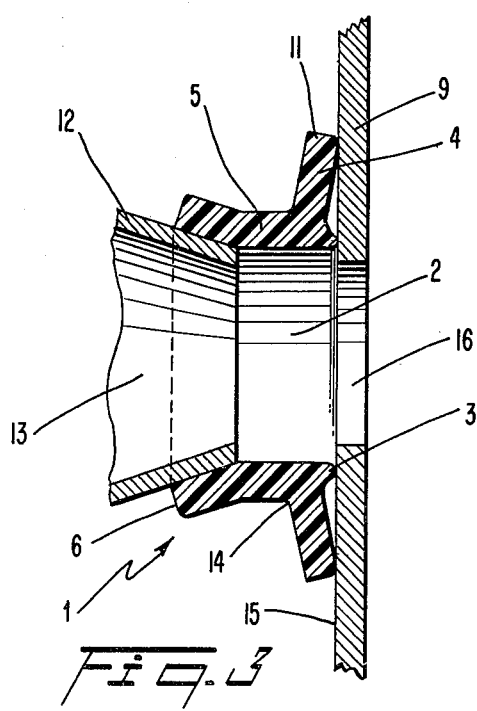
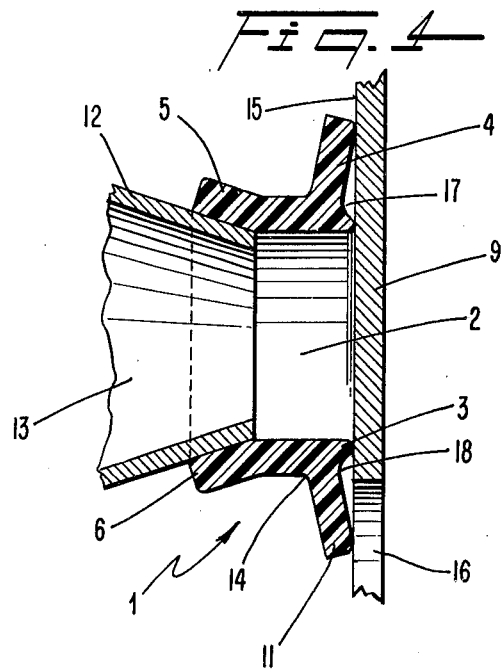

ELASTIC SEATING ELEMENT FOR A CUTOFF DEVICE

BACKGROUND AND OBJECTS OF THE INVENTION

The invention concerns an elastic seating element for a fluid flow cutoff device. Elastic seating elements are utilized in connection with cutoff devices of the type including a sealing part whose apertured surface slides across the seat during opening and closing movements. A seating element for use in such an environment is disclosed for example in U.S. Pat. No. 2,973,181. The supporting part of the seating element of that patent is designed in the form of a short cylindrical tube section, placed in telescopic fashion onto a section of a flow-through fitting which is tapered and protrudes into the housing of the shutoff device. The seating part of this known elastic seating element is designed in the form of a outer flange at its end facing the sealing part. The seating part has a circular surface against which the sealing part is pressed, thus forming a surface seal, and the sealing part will move across this surface when the shutoff device is actuated. If the sealing part is formed by a flat disk (e.g., the shutoff device comprises a rotary slide valve) the seating surface of the seating part will also be flat. If the sealing part is a cylindrical rotary piston (for example, if the shutoff device consists of a cock), the seating surface will then be surface complimentary, in other words designed in the shape of a cylinder.

This known seating element has the disadvantage that it is subject to failure if the fluid to be cutoff contains solid particles. When the sealing part moves relative to the seating element, the solid particles will enter the contact area between the seating part and the sealing part which acts as the sealing surface. They will have an abrasive effect there which will very quickly lead to a leakage of the shutoff device. This known seating element will therefore have an undesirable short service life, especially if the shutoff device is used frequently. This deficiency is especially critical if the shutoff device, for example, a rotary slide valve or a rotary piston cock, it utilized for cutting off the heating means of motor vehicle heaters. This heating means, usually water, always contains molding sand residues and rubbed-off particles. Furthermore, the shutoff devices for heating systems of motor vehicles are turned on and off very frequently.

German Gebrauchsmuster (GM) No. 7,321,690 proposed an improvement in the service life of the elastic seating element for the sealing part of a shutoff device used for fluids carrying solid particles by designing the seating element in the form of a looping ring which is held in place by a collar which surrounds the flow through opening in the housing. In comparison with the above-discussed flat surface seal, this looping ring has all the advantages offered by a circular seal over a flat surface seal. The looping ring, serving as seating element, has also a certain skimming effect on the sliding surface of the sealing part so that fewer solid particles will reach the sliding surfaces and the grooving will thus be reduced although it cannot be eliminated completely. However, there arises another disadvantage during the movement of the sealing part, pressed against the looping ring, with the movement being parallel to the plane of the ring, which cancels in practice the advantages of this specific seating element which are attainable in theory, namely, the so-called rolling of the seal. Whenever the edges of the opening or openings, provided in the sealing part, are passing over the ring, dragging effects will occur which lead to an irregular rolling twist of the ring and as a result thereof to leakages. Furthermore, due to this rolling the solid particles carried by the fluid to be cut off will again be rolled or pressed respectively between the sealing element and the sealing part so that grooves will form again and reduce the service life of the components.

An elastic seating element, described by the published German patent application No. 2,651,290, makes the attempt to combine the advantages of the above-described designs of seating elements while eliminating their disadvantages. This known seating element is primarily designed in the form of a cylindrical ring. The supporting part is designed as a ring of axial pins which can be pressed into corresponding recesses in the housing wall of the shutoff device. The front wall surface in contact with the housing wall and supporting the seating element is radially wider, approximately twice as wide, than the axially opposed front wall surface which slides at the sealing part. This seating element has an axial profile where the flow-through opening is strictly cylindrical throughout, and where the radial tapering from the greater outer diameter of the housing wall part to the smaller outer diameter of the seating element facing the sealing part occurs mainly at the side of the seating element facing the housing wall. Thus, the section of the seating element, which represents approximately one-half of the axial height and which faces the sealing part, is designed strictly cylindrically outside as well as inside, with right angles to the circular front wall surface. The section of this known elastic seating element which faces the sealing part has therefore the form of a short tubular section which rests at the sealing part with its front side which serves as a sealing surface. The radial width of this frontal area seal has a critical minimum size because a rolling of the seal will occur otherwise. Furthermore, the axial height of this cylindrical section of the seating element must not be made too great since the seal would then again have the tendency to roll. The right-angled arrangement of the transition between the cylinder wall surfaces and the front wall surface is used for the purpose of attaining a skimming effect at the sealing part. However, the actual result is still a surface seal of the type described above, with basically the same susceptibility to wear and tear as displayed by the flat surface seal discussed previously. The relatively smaller size of the sealing surface will cause a slight delay in the occurrence of a leakage of the seal. But the lengthening of the service life is definitely not proportional to the reduction in area because the reduction of the sealing surface will also lead more quickly to leakages. Furthermore, the surface friction between the seating element and the sealing part during the setting of the shutoff device is, in spite of the relative reduction in the sealing surface, still quite heavy, as is typical for any flat surface seal so that even this seating element requires rather great efforts for the setting of the shutoff device.

In view of this present state of art, it is an object of the invention to establish an elastic seating element for a shutoff device with a sealing part which slides along the seat at the time of opening and closing, wherein the seating element exhibits a long service life even in case of the presence of a greater amount of particulate matter in the fluid to be cut off and insures a definite and complete seal of the shutoff device at high surface pressures, and requires minimum opening and closing forces.

BRIEF SUMMARY OF A PREFERRED EMBODIMENT OF THE INVENTION

The invention involves an elastic seating element with a circular seal, or more specifically, a circular edge seal which forms directly the rim of the flow through opening. As a result thereof, it has the smallest possible frictional contact at the surface of the sealing part gliding at the seat and requires therefore the minimum shifting forces for any settings, the best achievement feasible considering the geometrical layout of the seal. These shifting forces can be reduced still further, and the sealing pressure, operative at the sealing edge, can be increased still further by designing the profile of the circular collar in such manner that it tapers off axially in direction of the sealing part in further development of the invention. Twisting of this circular seal during the shifting of the sealing part is definitely prevented in case of the seating element of the invention by the design of the circular seal in the form of an axially flat and radially narrow rim which is surrounded by a wide supporting flange, the actual seating part. This specific design of the seating part results in a very strong surface pressure within the region of the circular sealing rim without an increase in the force used for pressing the sealing part onto the seat. The supporting flange has its outer edge resting against the sealing part under a relatively low support pressure. A close contact of the entire surface of the flange-shaped seating part with the sealing part is prevented due to the arrangement that the inner sealing rim protrudes axially relative to the juncture with the surface of the seating element facing the sealing part (which surface acts as a supporting flange). Therefore, the specific design of the seating part, i.e., broadening its area and shaping the part in the form of a flange, will not effectively increase the force needed to operate the sealing part. A very slight increase of this force, relative to the forces required by known surface seals, is caused by the fact that the seating part makes contact at the edge of the flange which takes place at a relatively low support pressure. This support pressure is controlled primarily by the elastic restoring force of the material used for the manufacture of the seating element. It is this compact radial support at the edge which causes a stabilization of the circular rim and which definitely prevents any twisting and rolling, and thus any leakages.

The seating element has a dual skimming function when confronted with solid particles, deposited at the gliding surface of the sealing part and possibly leading to abrasions. Firstly, the outer edge of the flanged seating part has a skimming, lip-like effect, and secondly the inner circular rim closely surrounding the flow-through passage, has a skimming effect. Therefore, the surface of the sealing part which slides over the seat at the time of the setting of the sealing part will be cleansed twice during every setting operation so that any formation of grooves at the gliding surface of the sealing part or at the circular sealing edge of the circular rim becomes, for all practical purposes, impossible.

Solid particles which enter the annular area between the seating part and the sealing part across the circular collar and the outer edge of the seating part flange when the shutoff device is closed or not fully opened, cannot exert any abrasive action there because the surface of the sealing part and the surface of the seating part are not, or only under such slight pressure in contact with each other within this area that the solid particles which are enclosed there cannot affect this surface of the sealing part abrasively. Furthermore, they are being expelled from this area again at practically any position of the sealing part, except when fully opened. Finally, the presence of solid particles in this area is not even critical because this surface of the seating part has no sealing functions whatever. The seal between seat and surface of the sealing part is accomplished exclusively by the narrow, front-facing circular edge of the circular rim which is stabilized against any rolling and twisting by its radial support by the flange and which embraces closely the flow-through opening of the seat, forming its raised rim.

The seating element comprises an elastomer, onto which is vulcanized at the time of its shaping a polytetrafluoroethylene (PTFE) foil which covers the entire surface of the seating part facing the sealing part, including the circular sealing rim, and which extends axially across the rim up to and into the flow-through opening of the seat. The PTFE foil extends also in corresponding manner at the outer edge of the seating part and thereacross, to the opposite edge of the seating part which is more remote from the sealing part. The surfaces of the seating part and the sealing part which are complimentary to each other can be shaped, in a manner known per se, either flat, cylindrical or conical.

The supporting part can be cylindrical bead-edged, designed in the form of a rim carrying retaining pegs or pins, or formed in some other manner. It is also possible to utilize the outer edge of the seating part as the supporting element by providing suitable stops or recesses in the housing of the shutoff device. However, the supporting part is preferably designed in the form of a cylindrical axial extension of the circular collar in its rear and held in place at the housing of the shutoff device, thereby providing the circular collar with a great elasticity under axial pressure and a practically complete inflexibility against radial deformation.

THE DRAWING

The invention will now be explained in detail in connection with a preferred embodiment thereof and in connection with the drawings wherein:

FIG. 1 is a top view of a seating element as seen from the sealing part side;

FIG. 2 is an axial section of the element depicted in FIG. 1;

FIG. 3 shows the element of FIG. 2 together with a disk-shaped sealing part in its open position; and FIG. 4 depicts the element of FIG. 2 together with a disk-shaped sealing part in its closed position.

DETAILED DESCRIPTION OF A PREFERRED EMBODIMENT OF THE INVENTION

FIG. 1 illustrates, in top view, a species of the elastic seating element 1 as seen from the sealing part side. The flow-through opening or passage 2 of the seat is closely encircled and embraced by a circular collar 3 which forms the rim of this passage. The circular collar 3 is surrounded by a relatively wide seating part 4 which has a flange-like design. This seating part 4 is oriented substantially transversely relative to the flow-through direction.

The seating part 4 is formed integrally of one piece with a supporting part 5, in the manner depicted by FIG. 2. The supporting part 5 is arranged substantially perpendicular to the seating part 4, is axially parallel with the flow-through direction, and is designed in the shape of a cylinder. The cylindrical supporting part 5 can be placed onto a fitting 12 of a flow-through passage in the housing, embracing its outside, or it can be inserted into a corresponding recess in a passage within the housing, designed in the form of a fitting. The cylindrical supporting part 5 is arranged coaxially relative to the circular rim 3, forming its axial rearward extension. A face 6 on the rear of the part 5, or its internal edge 7, is supported rigidly or elastically at the housing of the shutoff device so that due to the elastic properties of the elastomer, (the seating element 1, comprising the supporting part 5 and the seating part 4, being manufactured from this material) the front-facing sealing 8 of the circular collar 3 will be pressed under great elasticity against an apertured sealing member or part 9 (see FIGS. 3 and 4). The fitting 12 and the apertured sealing member 9 define portions of the through-passage 13.

The surface 18 of the seating part 4, facing the sealing part, and the circular rim 3 are covered with a polytetrafluoroethylene (PTFE) foil 10 in the manner shown by FIG. 2. This figure also shows that the PTFE foil 10 surrounds the outer edge 11 of the seating part 4 axially in the rear and extends into the flow-through opening 2 of the seat. The elastomer is preferably vulcanized directly onto the PTFE-foil 10 at the time when the seating element is being shaped from this elastomer. The foil thus constitutes a portion of the rim 3, and the surface 18 and the outer edge 11 of the surface 18.

The rim 3 projects axially beyond the juncture between the rim 3 and the surface 18. The rim tapers axially toward the oppositely facing face of the sealing member 9.

FIG. 3 shows the embodiment depicted in FIGS. 1 an 2, in axial cross-section and in diagram form, being utilized for its above-specified purpose in combination with a flat, disk-shaped sealing part 9. The supporting part 5 is placed onto a conically designed fitting 12 containing a portion of the housing flow-through passage 13. The conical design of a flow-through fitting 12 forces the rubber-elastic seating element 1 against the sealing part 9. This load can be intensified by the use of a spring which engages either the rear face 6 or a neck 14 of the seating element 1. In this manner, the circular rim 3 of the seating element 1 will be pressed firmly onto a gliding surface 15 of the sealing part 9. Thus, the seating element is placed under compression between the supporting part 5 and the rim 3. The counterpressure by the sealing part 9, directed axially rearward at the circular collar 3, will deform the seating element 1 such that its outer edge 11 will contact the gliding surface 15 of the sealing part 9 in the manner depicted (exaggerated by and not to scale) in FIG. 3. The pressure of the edge of edge 11 of the seating part 4 against the gliding surface 15 of the sealing part 9 amounts only to a fraction of the pressure at which the edge 8 of the circular rim 3 is forced against this same surface.

The PTFE foil has been omitted in FIGS. 3 and 4 for reasons of clarity. FIG. 3 depicts the open position of the shutoff device, with the aperture or flow-through opening 2 of the seat and the flow-through passage portion 13 of the housing. FIG. 3 shows that in this case the diameter of the circular rim 3 is slightly greater than the free inner diameter of the flow-through passage portion 16 of the sealing part 9 and that this opening is therefore sealingly surrounded by the circular rim 3 when the shutoff device is in its open position as shown in FIG. 3.

FIG. 4 depicts the embodiment shown in FIG. 3 when the sealing part 9 is in the closed position. The shallow annular area 17 between the seating part 4 and the sealing part 9, formed radially between the circular rim 3 and the outer edge 11 of the seating part 4, freely communicates with the interior of the housing of the shutoff device by the clearance of the flow-through aperture 16 of the sealing part 9 so that the solid particles can be washed out of this annular area 17 (see the communication depicted between the area 17 and the aperture 16 at the lower portion of FIG. 4).

During the rotary or translatory sliding or gliding motion of the sealing part 9 at the seating element 1, the outer edge 11 (and in light contact with the gliding surface 15 of the sealing part 9) and the circular collar 3 press forcefully against this gliding surface 15 to act as skimmers and remove the solid particles sticking to the gliding surface 15. This arrangement makes it practically impossible that such solid particles, which would have an eroding effect, could reach the extraordinarily small surface of contact, shaped in the form of an annular edge, between the front-facing sealing edge 8 of the circular rim 3 and the gliding surface 15 of the sealing part 9. The seating element 1 will therefore definitely have a long service life even if the medium to be shut off contains a rather large portion of abrasive solid particles.

A radial twisting, rolling or other deformation of the circular rim 3 which could occur when the sealing part 9 is sliding across the seat is definitely prevented by the form-stabilizing support at the outer edge 11 of the seating part 4.

The seating element 1 is not a flat surface seal in spite of the wide, flange-like and surface-favoring design of the seating part 4. Rather, due to the circular rim 3 the element constitutes a pure annular edge seal. Since the surface 18 of the seating part 4 is not in contact with the gliding surface 15 of the sealing part 9 with the exception of its outer edge 11, and since this contact is subjected only to a fraction of the sealing pressure which arises at the circular rim 3, the shifting forces required to move the sealing part 9 are practically as low as in the case of a plain annular edge seal of minimum diameter, that is, a diameter which substantially equals the interior diameter of the opening or flowthrough passage defining portion 2 of the seat.

FIGS. 2 to 4 illustrate the seating element 1 for use in connection with a flat, disk-shaped sealing part. If a cylindrical or conical spigot which is adjustable by turning it about its own axis is used as the sealing part, the seating element 1 will be designed basically in the same manner as explained above. However, it will solely be necessary to shape the surface 18 of the seating part 4 complimentary to the shape of he sealing part surface, that is with a cylindrical or conical curvature. The effect and the function of such seating element will be basically identical with those of the seating element illustrated in FIG. 3.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. An elastic seating element for use in combination with a fluid flow cutoff device of the type including first means defining a first portion of a flow-through passage, second means defining a second portion of said flow-through passage, and a seating element having an opening extending therethrough and disposed between said first and second passage defining means, said second passage-defining means comprising a sealing member having a seal face and an aperture therein forming said second passage portion, said sealing member mounted for sliding movement of its seal face across said seating element between flow-open and flow-closed positions, wherein said second passage portion is aligned with said opening in said flow-open position and said seal face covers said opening in said flow-closed position, said seating element being of the type comprising a supporting portion mounted to said first passage-defining means to align said opening and said first passage portion, and a seating portion including a surface oriented transversely relative to said opening and facing said second passage defining means, the improvement wherein:

said seating element comprises a rim extending around an end of said opening in facing relation to said seal face and projecting axially outwardly relative to a juncture between said rim and said transverse surface, said transverse surface forming an edge means spaced radially outwardly of said rim and said supporting portion, said seating element and said seal face being pressed axially together in said flow-open and flow-closed positions, said rim, transverse surface and edge means being of integral one-piece construction such that axial pressing forces transmitted to said rim and edge means press said rim and said edge means against said face in said flow-open and flow-closed positions.

2. A seating element according to claim 1, wherein said rim tapers axially toward said sealing member.

3. A seating element according to claim 1, wherein said seating element is formed of an elastomeric material, a polytetrafluoroethylene foil covering said one-piece rim and transverse surface of said seating element and exends into said opening in said sealing element and extends over said edge means.

4. A seating element according to claim 1, wherein contact pressure between said face and said rim being greater than that between said face and said edge means.

5. A seating element according to claim 1, wherein said transverse surface overlaps a portion of said second passage portion in said flow-closed position to clean an area between said rim and edge means.

* * * * *